United States Patent
Jayaram et al.

(10) Patent No.: US 12,400,465 B2
(45) Date of Patent: Aug. 26, 2025

(54) CUSTOMIZABLE DATA EXTRACTION SERVICE

(71) Applicant: SAP SE, Walldorf (DE)

(72) Inventors: Sivakanth Jayaram, Kerala (IN);
Shruthi Annappa, Bangalore (IN);
Prasanna Bhat Mavinakuli, Sagar Tz. (IN)

(73) Assignee: SAP SE, Walldorf (DE)

( * ) Notice: Subject to any disclaimer, the term of this patent is extended or adjusted under 35 U.S.C. 154(b) by 488 days.

(21) Appl. No.: 18/100,334

(22) Filed: Jan. 23, 2023

(65) Prior Publication Data
US 2024/0249543 A1 Jul. 25, 2024

(51) Int. Cl.
*G06V 30/412* (2022.01)
*G06V 10/82* (2022.01)
*G06V 30/19* (2022.01)
*G06V 30/413* (2022.01)

(52) U.S. Cl.
CPC ............ *G06V 30/412* (2022.01); *G06V 10/82* (2022.01); *G06V 30/19147* (2022.01); *G06V 30/413* (2022.01)

(58) Field of Classification Search
None
See application file for complete search history.

(56) References Cited

U.S. PATENT DOCUMENTS 11,556,558 B2 * 1/2023 Kabra ...................... G06N 5/02

OTHER PUBLICATIONS

"Document Information Extraction", SAP SE, [Online]. Retrieved from the Internet: <URL: https://help.sap.com/docs/DOCUMENT_INFORMATION_EXTRACTION/5fa7265b9ff64d73bac7cec61ee55ae6/020ab638cfa84eb08caa26f5dbf3b8ef.html>, (Dec. 7, 2022), 200 pgs.

* cited by examiner

*Primary Examiner* — Lennin R Rodriguezgonzalez
(74) *Attorney, Agent, or Firm* — SCHWEGMAN LUNDBERG & WOESSNER, P.A.

(57) ABSTRACT

Example methods and systems are directed to data extraction from input data objects. A data extraction schema may define at least a first feature and a second feature. The first feature may be associated with a first machine learning model and the second feature may be associated with a second machine learning model. A first input data object is accessed. The first machine learning model may be used to extract a first output data object associated with the first feature from the first input data object, based on the data extraction schema. The second machine learning model may be used to extract a second output data object associated with the second feature from the first input data object, based on the data extraction schema. The first output data object and the second output data object may be presented on a user interface.

20 Claims, 11 Drawing Sheets

| | | |
|---|---|---|
| 402 | SCHEMA ID | 34H765D9078 |

| | | |
|---|---|---|
| 404 | CLIENT ID | 568421 |

| | | |
|---|---|---|
| 406 | DOCUMENT TYPE | INVOICE |

| | | |
|---|---|---|
| 408 | HEADER FIELD | |
| 410 | FIELD NAME | DOCUMENT NUMBER |
| 412 | FORMATTING TYPE | STRING |
| 414 | EXTRACTION TYPE | MODEL |
| 416 | DEPLOYMENT IDENTIFIER | A1B1C1D1 |

| | | |
|---|---|---|
| 418 | LINE ITEM FIELD | |
| 420 | FIELD NAME | QUANTITY |
| 422 | FORMATTING TYPE | NUMBER |
| 424 | EXTRACTION TYPE | MODEL |
| 426 | DEPLOYMENT IDENTIFIER | A1B1C1D2 |

FIG. 4

CUSTOMIZABLE DATA EXTRACTION SERVICE

TECHNICAL FIELD

The subject matter disclosed herein generally relates to automated data extraction. Specifically, the present disclosure addresses systems and methods to use custom data extraction schemas and machine learning models for data extraction.

BACKGROUND

Machine learning models are applications that provide computer systems the ability to perform tasks, without explicitly being programmed, by making inferences based on patterns found in the analysis of data. Machine learning explores the study and construction of algorithms, also referred to herein as models, that may learn from existing data and make predictions about new data.

BRIEF DESCRIPTION OF THE DRAWINGS

Some embodiments are illustrated by way of example and not limitation in the figures of the accompanying drawings.

FIG. 4 is a block diagram illustrating aspects of a data extraction schema, according to some examples, suitable for use in automated data extraction.

DETAILED DESCRIPTION

Figure 1:
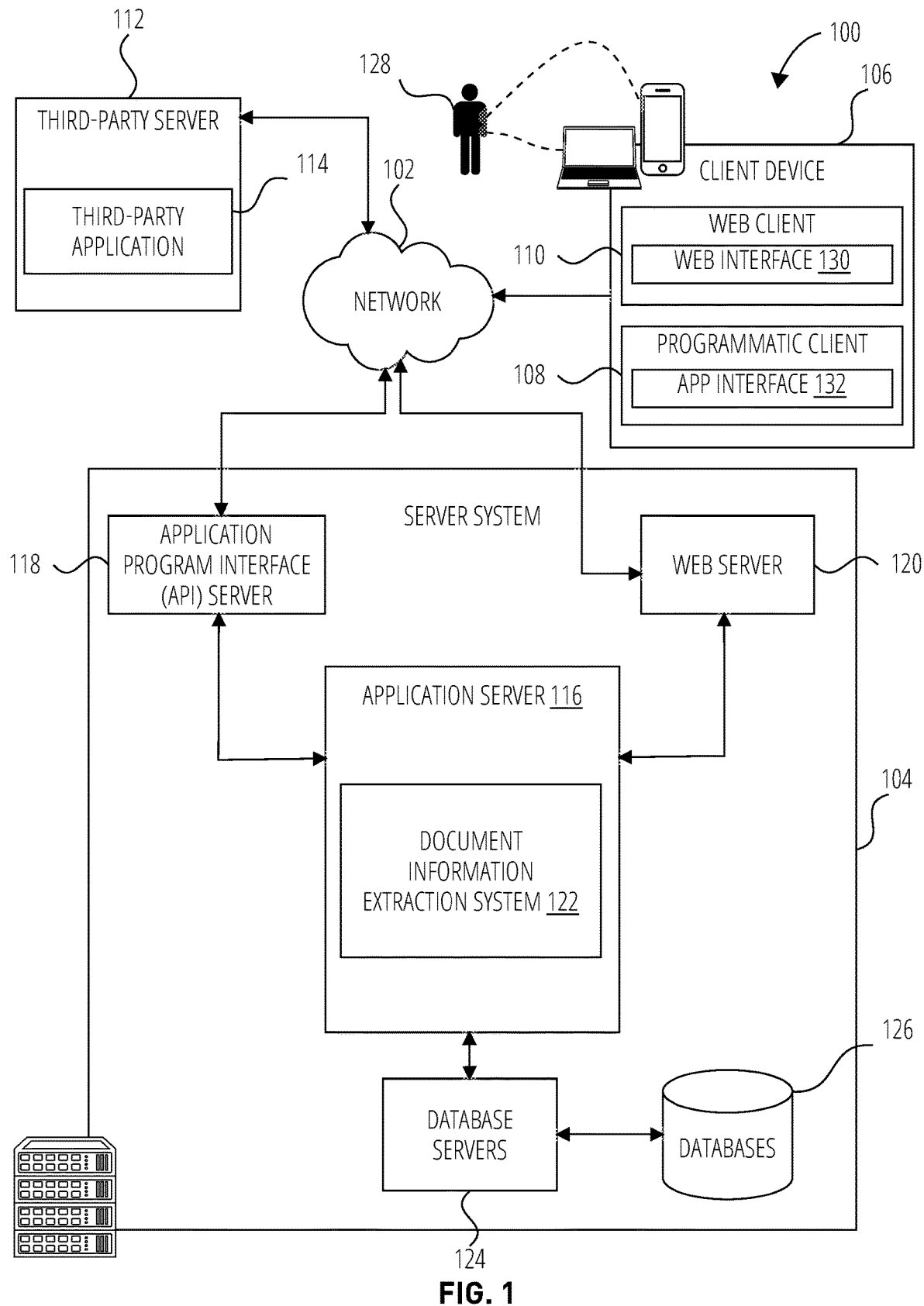
FIG. 1 is a diagrammatic representation of a network environment suitable for data extraction using machine learning models, according to some examples.

Example methods and systems are directed to data extraction using custom data extraction schemas. A custom data extraction schema may link a plurality of features to respective extractors, such as machine learning models. Such a data extraction schema can be used in the extraction of output data objects from an input data object.

As used herein, the term "data object" refers to any computer-processed item of data. A data object may, for example, comprise a simple data type such as a character, integer, float, or double, a structure comprising multiple simple data types or structures, a document, or any suitable combination thereof. As used herein, the term "document" refers to a collection of content in any machine-readable or machine-processable format, e.g., Joint Photographic Experts Group (JPEG) format or Portable Document Format (PDF), including both textual and image-based PDF documents. A document may thus include a plurality of data objects, e.g., text data objects, image data objects, or both. Data objects in a document may be structured into one or multiple pages. Example documents include invoices, purchase orders, payment advice, business cards, word processing files, passports, identity cards, emails, academic papers, articles, court cases, books, and so on.

As used in the context of a data extraction schema herein, the term "feature" refers to any attribute or part of a data object that has one or more values associated with it. A feature may have a value that forms part of, or is contained in, another data object, and that can be extracted, inferred, or otherwise obtained from the other data object using a computer process. By way of example, an invoice may include values for a number of features and one or more of these features may be defined in a data extraction schema. An invoice may, for instance, include a value for an "invoice number" feature and a value for an "invoice date" feature. In some examples, such values may be obtained from a document by a computer process, with the document being referred to as an "input data object" and the obtained values (being the value for each feature) referred to as "output data objects."

A user may have a need for an automated system suitable for extracting values from multiple documents, obviating the need for a human to read each document and type the relevant values into a computer system. Examples are directed to the creation of a data extraction schema. The data extraction schema may be job-specific or client-specific, e.g., the data extraction schema may be created to extract values for one or more features from documents provided by a specific user or client.

In some examples, the data extraction schema defines a plurality of features. Each feature is associated with an extractor such as a machine learning model. Each machine learning model may be referred to as feature-specific because the machine learning model may be specifically, or even exclusively, trained for extraction associated with the feature to be associated with that machine learning model. In some examples, a machine learning model may be trained to extract a particular feature using dedicated training data for that particular feature. This may include annotated training data to facilitate training of the machine learning model to identify and extract (or predict) a value of the particular feature. By processing feature-specific training data, internal variables of the machine learning model are adjusted so that the accuracy of its predictions related to the feature of interest is improved and the error rate of the machine learning model is minimized.

Once trained, a machine learning model may be associated with the relevant feature by mapping an identifier of the machine learning model, referred to herein as a model deployment identifier, to the relevant feature in the data extraction schema. A feature in a data extraction schema may, in some examples, be linked to another type of extractor (not a machine learning model), such as a rule-based engine. Once each feature in the data extraction schema has been linked to an extractor, e.g., by a model deployment identifier or by some other extractor identifier, the data extraction schema can be used to extract output data objects representing respective values associated with the features from an input data object, such as an input document (or multiple input documents).

Responsive to receiving an input data object which includes values associated with a plurality of features, the extractor corresponding to each feature automatically extracts (or predicts) the value associated with that feature. Extraction of multiple values may be performed at least partially in parallel, and the extracted values are output as output data objects. The output data objects may be post-processed to generate a set of output data in a suitable format. The set of output data may include a confidence level associated with an extraction result, indicative of how certain a machine learning model is about its prediction.

Examples disclosed herein provide for a flexible and customizable, yet accurate, extraction service for input data objects, such as business-related documents. Multiple feature-specific machine learning models may be applied separately, but to the same document, to predict values for the respective features of interest. As a result, systems according to examples described herein may perform better (e.g., be more accurate and/or require less human intervention) than systems relying on a generic, pre-trained model to predict values for multiple features. Systems according to examples described herein may provide a user with enhanced flexibility by allowing for granular assignment of machine learning models and/or other extractors to features within a custom data extraction schema. In some examples, efficiencies may be improved by adopting a hybrid allocation methodology, e.g., assigning an existing, trained machine learning model to a first feature of a document which can be accurately predicted with the existing model, and training a bespoke, new machine learning model which can be assigned to a second feature, where the second feature is relatively peculiar and/or otherwise not obtainable with a high degree of accuracy using the existing model.

When the effects in this disclosure are considered in aggregate, one or more of the methodologies described herein may obviate a need for certain efforts or resources that otherwise would be involved in data extraction. Computing resources used by one or more machines, databases, or networks may be more efficiently utilized or even reduced, e.g., as a result of enhanced accuracy or flexible model allocation. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed.

One or more servers in a server system 104 provide server-side functionality via a network 102 to a networked user device, in the example form of a client device 106 that is accessed by a user 128. A web client 110 (e.g., a browser) and/or a programmatic client 108 (e.g., an "app") may be hosted and executed on the web client 110.

An Application Program Interface (API) server 118 and a web server 120 provide respective programmatic and web interfaces to components of the server system 104. A specific application server 116 hosts a document information extraction system 122, which includes components, modules and/or applications.

The client device 106 can communicate with the API server 118, e.g., via the web interface supported by the web server 120 and/or via the programmatic interface provided by the API server 118. It will be appreciated that, although only a single client device 106 is shown in FIG. 1, a plurality of user devices may be communicatively coupled to the server system 104 in some examples. Further, while certain functions are described herein as being performed at either the client device 106 (e.g., web client 110 or programmatic client 108) or the server system 104, the location of certain functionality either within the client device 106 or the server system 104 may be a design choice. For example, it may be technically preferable to initially deploy particular technology and functionality within the server system 104, but to migrate this technology and functionality to a programmatic client at a later stage, e.g., when the client device 106 has sufficient processing capacity.

The application server 116 is communicatively coupled to database servers 124, facilitating access to an information storage repository or databases 126. In some examples, the databases 126 include storage devices that store information to be processed or transmitted by the document information extraction system 122.

The application server 116 accesses application data (e.g., application data stored by the database servers 124) to provide one or more applications to the client device 106 via a web interface 130 or an app interface 132. For example, and as described further below according to examples and with reference to FIGS. 3-8, the application server 116, using the document information extraction system 122, may provide a document information extraction application. The document information extraction application may enable the user 128 to create and/or define a data extraction schema. The document information extraction application may receive documents from the client device 106 and cause extraction of values from the documents using machine learning models and/or other extractors, based on the data extraction schema. For example, the document information extraction application may provide for the extraction of output data objects, in a structured format, from an input data object in the form of a document containing multiple data objects in an unstructured format. The document information extraction application may also provide model training functionality, as described below according to some examples.

The user 128 may wish to extract values related to multiple fields from each of a large set of business documents. Using an invoice as an example business document, the structure and format of invoices can vary widely across different businesses, industries and regions, and the set of invoices of the user 128 may have a unique structure and/or include non-standard fields (such as header fields or line item fields), making a generic artificial intelligence-based extraction system, e.g., one using optical character recognition (OCR) and a pre-trained extraction model, unsatisfactory. As another example, the user 128 may have a unique set of business documents for which no "template" extractor tool exists, or which has at least one feature (e.g., field) for which there is no machine learning extraction model available. The document information extraction application according to examples in this disclosure allows the user 128 to create a bespoke data extraction schema and to train and/or allocate specialized models to extract values for specific fields, line items, table entries, or the like, based on the data extraction schema.

To access the document information extraction application, the user 128 may create an account with an entity associated with the server system 104, e.g., a service provider (or access an existing account with the entity). The user 128 may use account credentials to access the web interface 130 (via a suitable web browser) and request access to the document information extraction application. The document information extraction system 122 may automatically create a service instance associated with the document information extraction application at the application server 116 which can be accessed by the client device 106 via one or more service APIs to utilize functionality described herein. The user 128 may also, in some examples, access the document information extraction application using a dedicated programmatic client 108, in which case some functionality may be provided client-side and other functionality may be provided server-side.

One or more of the application server 116, the database servers 124, the API server 118, the web server 120, and the document information extraction system 122, may each be implemented in a computer system, in whole or in part, as described below with respect to FIG. 11. In some examples, a third-party application 114 executing on a third-party server 112, has programmatic access to the application server 116 via the programmatic interface provided by the API server 118. For example, the third-party application 114, using information retrieved from the application server 116 via the network 102, may support one or more features or functions on a website hosted by a third party, and/or the third-party application 114 may perform certain methodologies and provide input or output information to the application server 116 for further processing and/or publication. For example, a third-party application 114 may perform certain machine learning related functions based on instructions received from the document information extraction system 122.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
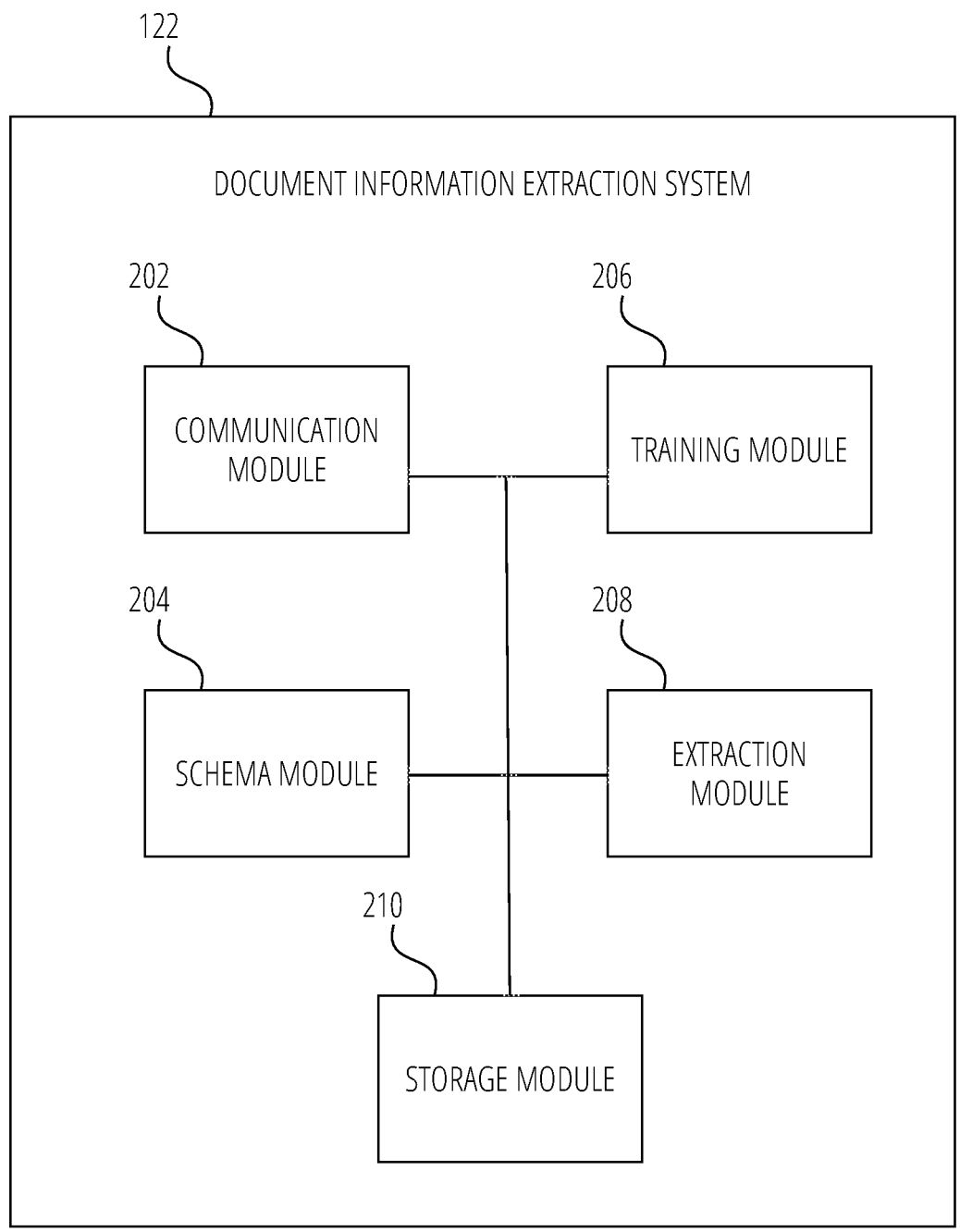
FIG. 2 is a block diagram of a document information extraction system, according to some examples.

FIG. 2 is a block diagram of a document information extraction system 122, suitable for data extraction using machine learning models, according to some examples. The document information extraction system 122 is shown as including a communication module 202, a schema module 204, a training module 206, an extraction module 208, and a storage module 210, all configured to communicate with each other (e.g., via a bus, shared memory, or a switch) to implement aspects of the document information extraction application. Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

The communication module 202 receives data sent to the document information extraction system 122 and transmits data from the document information extraction system 122. For example, the communication module 202 may receive, from the application server 116 of FIG. 2 or the database servers 124, schema information, training data for machine learning model training and/or input data objects for data extraction. For example, input data objects in the form of digitized business documents (such as invoices, payment advice documents, or the like) may be uploaded by the user 128 of FIG. 1 to the document information extraction system 122 for extraction of feature values. In some examples, the document information extraction system 122 is configured to receive requests and other data via API calls and return responses and results via the communication module 202, e.g., comprising data objects in the JavaScript Object Notation (JSON) data interchange format.

The schema module 204 may be configured to facilitate creation of a data extraction schema, upon which data extraction is based. The schema module 204 may, for example, receive user input regarding features to be included in a data extraction schema, data types of features, and details of extractors to associate with each feature, e.g., model deployment identifiers to associate each feature with a machine learning model. In some examples, each feature may be associated with a corresponding machine learning model by the schema module 204. The schema module 204 may process the user input and implement the data extraction schema in response to an input data object being submitted for extraction. The data extraction schema may be created in any suitable format, depending on the network implementation, e.g., JSON format.

The training module 206 may perform or facilitate certain training processes, such as supervised learning involving receiving a training set comprising a plurality of sample documents with annotations linked to a given feature and causing a machine learning model to be trained on the training set for extraction of that given feature. The extraction module 208 may be configured to cause extraction, based on the data extraction schema, and using a specific machine learning model of an output data object associated with a feature of an input data object. Where the data extraction schema includes multiple features linked to different machine learning models and/or other extractors, the extraction module 208 may cause such extraction for each feature using the machine learning model linked to that feature.

The document information extraction application may receive input data objects and return structure information related to extracted values, e.g., in JSON format, as mentioned above. Outputs, such as extraction results, may be stored in the databases 126 via the storage module 210. Output data may be transmitted to the client device 106 by the communication module 202 and presented on a user interface, e.g., the web interface 130. Communications sent and received by the communication module 202 may be intermediated by the network 102.

Figure 3:
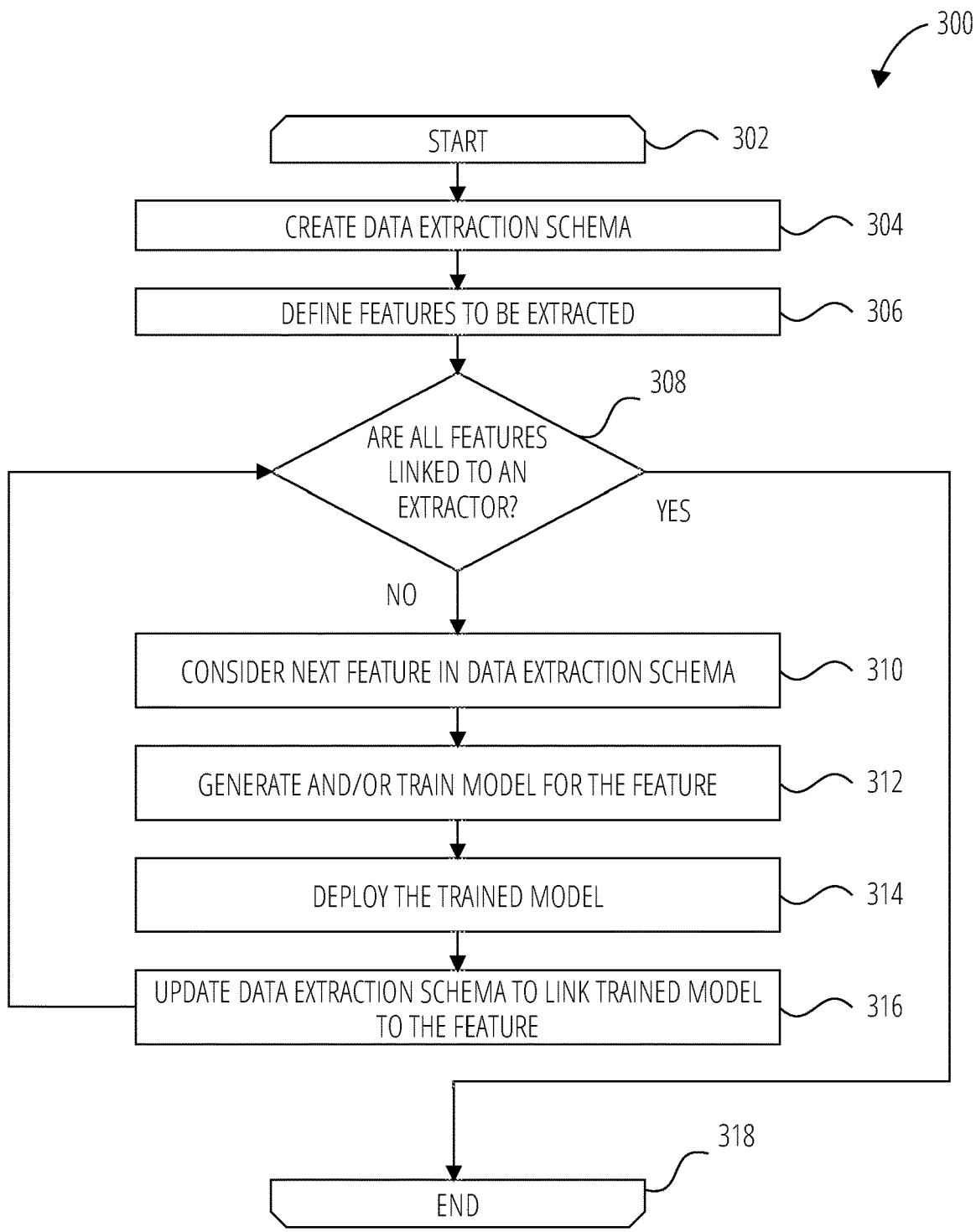
FIG. 3 is a flowchart illustrating operations of a method suitable for creating and updating a data extraction schema, according to some examples.

FIG. 3 is a flowchart illustrating operations of a method 300 suitable for creating and updating a data extraction schema, according to some examples. By way of example and not limitation, aspects of the method 300 may be performed by the modules, components and databases shown in FIG. 1 and FIG. 2.

The method 300 commences at opening loop operation 302 and proceeds to operation 304, where a new data extraction schema is created. The document information extraction application may allow for the creation of the data extraction schema based on user input received from the user 128, via the client device 106, both of FIG. 1. In some examples, a user may use the document information extraction application to process large amounts of business documents that have content in headers, tables, or the like.

Extracted information can, for example, be used to process payables or invoices automatically.

The user 128 may wish to upload a number of invoices to the application server 116 of FIG. 1 for the document information extraction system 122 of FIG. 1 to extract values for two specific features from the invoices. The features "document number" and "quantity" will be used as examples of invoice features. In other words, the user 128 uses the document information extraction system 122 to extract a header field value, being the document number, and a line item value, being the quantity, from each of a plurality of invoices. It will be appreciated that this is merely an example and that other document types, features and/or any suitable number of features may be specified. For example, a user may specify one or more of the following features of a document for extraction (including both header fields and line items): currency code, delivery date, discount, document date, document number, due date, gross amount, payment terms, purchase order number, receiver address, receiver name, or quantity.

Returning to the example described with reference to FIG. 3, the user 128 may provide user input (e.g., via the web interface 130 of FIG. 1) to define the document type, document structure, features to be included in the data extraction schema, as well other metadata to define aspects relating to the schema and each feature. The document information extraction system 122 processes the user input to create the data extraction schema. For example, the user 128 may specify the document as being an invoice, the first feature as "document number" and the second feature as "quantity," and specify a data type and/or format of each feature (operation 306). Extracts from example methods (in JSON format) suitable for schema creation and addition of features to the schema (in this case, two fields of interest) are shown below.

Schema Creation:

```
{
  "clientId": "{{client}}",
  "name": "Custom_Invoice_Schema",
  "schemaDescription": "Schema For Custom Invoice training",
  "documentType": "invoice",
  "documentTypeDescription": "Invoice with invoice number and quantity"
}
```

Adding the first feature and the second feature to the data extraction schema (with their metadata):

```
{
  "headerFields": [{
    "name": "DocumentNumber",
    "description": "",
    "defaultExtractor": { },
    "setupType": "static",
    "setupTypeVersion": "1.0.0",
    "setup": {
    },
    "formattingType": "string",
    "formatting": { },
    "formattingTypeVersion": "1.0.0"
  }],
  "lineItemFields": [{
    "name": "Quantity",
    "description": "",
    "defaultExtractor": { },
    "setupType": "static",
    "setupTypeVersion": "1.0.0",
    "setup": {
```

-continued

```
    },
    "formattingType": "number",
    "formatting": { },
    "formattingTypeVersion": "1.0.0"
  }]
}
```

It will be noted that, in the above extract, the data type of the first and second feature, respectively, are defined as "string" and "number", by specifying the data type against "formattingType." When extraction takes place, an extractor may automatically interpret or predict a value for a feature based on (or guided by) the data type specified in the data extraction schema.

Instead of using a generic information extraction tool to predict all values of interest, the user 128 can use the document information extraction system 122 to customize the data extraction schema, including linking each feature to a specific extractor, such as a machine learning model or rule-based engine. To this end, at decision operation 308, the method 300 comprises checking whether all features are linked to an extractor. If not, the method 300 progress to operation 310 where the next feature is considered. In this example, the first feature (document number) does not yet have a linked extractor and this feature is considered first.

At operation 312, a first feature-specific machine learning model is generated and/or trained for extracting the document number from each invoice. Once the first machine learning model has been deployed (operation 314), the data extraction schema is updated to link the first machine learning model to the first feature (document number) at operation 316. An extract from an example method (in JSON format) suitable for schema updating, to link the first machine learning model to the feature it will be deployed for, is shown below.

Updating the schema to link the first machine learning model to the first feature:

```
{
  "headerFields": [{
    "name": "DocumentNumber",
    "description": "",
    "defaultExtractor": { },
    "setupType": "static",
    "setupTypeVersion": "1.0.0",
    "setup": {
      "type": "model",
      "priority": 1,
      "filter": [{
        "key": "language",
        "value": "EN"
      },
      {
        "key": "language",
        "value": "DE"
      }
    ],
    "properties": [{
```

-continued

```
        "key": "deploymentId",
        "value": "a1b1c1d1"
      }]
  }
```

In the extract above, the value for the "deploymentId" key for "DocumentNumber" represents a first model deployment identifier. It will be noted that one or more languages may be specified in language fields in the document extraction schema to indicate the relevant languages in the documents of interest ("EN" refers to "English" and "DE" refers to German" in this example).

The method 300 then moves back to the decision operation 308 to check whether all features are linked to an extractor. In this example, the second feature (document number) does not yet have a linked extractor and this feature is considered next. The method 300 progresses to operation 310 where the next feature is considered.

At operation 312, a second feature-specific machine learning model is generated and/or trained for extracting the quantity from each invoice. Model training is described in greater detail below, with reference to examples. However, in this example, both the first machine learning model and the second machine learning model are convolutional neural networks trained specifically for detecting and predicting the value associated with a specific feature.

Once the second machine learning model has been deployed (operation 314), the data extraction schema is updated to link the second machine learning model to the second feature (document number) at operation 316. An extract from an example method (in JSON format) suitable for schema updating, to link the second machine learning model, is shown below.

Updating the schema to link the second machine learning model to the second feature:

```
{
  "lineItemFields": [{
     "name": "Quantity",
     "description": "",
     "defaultExtractor": { },
         "setupType": "static",
     "setupTypeVersion": "1.0.0",
     "setup": {
        "type": "model",
        "priority": 1,
        "filter": [{
           "key": "language",
           "value": "EN"
        },
        {
           "key": "language",
           "value": "DE"
        }
     ],
     "properties": [{
           "key": "deploymentId",
           "value": "a1b1c1d2"
     }]
  }
}
```

In the extract above, the value for the "deploymentId" key for "Quantity" represents a second model deployment identifier. Once all features are linked to a machine learning model, the method 300 concludes at closing loop operation 318.

In some examples, where an existing model or rule-based engine exists which can be used to extract for a specific feature, the existing model or rule-based engine may be identified as a "default extractor". The "default extractor" may be used as an alternative to, or in addition to, the newly trained model identified in the data extraction schema by the model deployment identifier. In some examples, multiple models may be associated with a particular feature, e.g., by adding multiple model deployment identifiers and specifying, relatively, priorities in the data extraction schema. In other words, there may be a one-to-many relationship between a particular feature of interest and extractors to be used to predict/extract for that feature. However, in the example described with reference to FIG. 3, only one model is associated with each feature and the default extractor field is left empty in the data extraction schema to indicate that a custom extraction tool will be trained and deployed.

The document information extraction system 122 may support various document structures and layouts, with a user being enabled to define their own schema, including a document type, document structure, and a custom set of features (e.g., fields). The user may also provide training data and/or annotate a "ground truth", as described further below. The user's custom data extraction schema is used for extraction and the user is not restricted to a specific schema or the use of a specific extraction model to obtain values for a given feature. This may facilitate automated processing of documents with a reduced error rate, while providing a flexible end-user tool.

FIG. 4 is a block diagram illustrating elements of a data extraction schema 400, according to some examples. The data extraction schema 400 is identified by a unique schema identifier in the form of a schema ID 402. The data extraction schema 400 is client-specific and thus defines a client identifier in the form of a client ID 404.

The example of an invoice including the features "document number" and "quantity," as described with reference to FIG. 3, are shown in FIG. 4. The data extraction schema 400 defines the document type 406 as "INVOICE" and has a header field 408 and a line item field 418. The header field 408 defines the "DOCUMENT NUMBER" field name 410 (first feature), as well as the formatting type 412, also referred to as data type ("STRING"), extraction type 414 ("MODEL"), and model deployment identifier 416 associated with the first feature.

The extraction type 414 is specified as "MODEL", because in this example, a custom model is used. In other examples, a different extraction type such as a rule-based setting may be specified for a particular feature. The model deployment identifier 416 identifies the first machine learning model, as described with reference to FIG. 3, and may be linked to a Uniform Resource Locator (URL) providing access to the first machine learning model. The line item field 418 defines the "QUANTITY" field name 420 (second feature), as well as the formatting type 422 ("NUMBER"), extraction type 424 ("MODEL"), and model deployment identifier 426 associated with the second feature. The model deployment identifier 426 identifies the second machine learning model, as described with reference to FIG. 3, and may be linked to a URL providing access to the second machine learning model.

The data extraction schema 400 may be updated from time to time, as required by a user. For example, the user may add additional fields (features) to the data extraction schema 400 and associate each additional field with a machine learning model and/or other extractor to be used for extraction of values associated with the additional field. In this way, the user may be provided with a flexible tool that allows for user-defined mapping of features to models, within a single, modifiable schema. For example, if a need arises to use the document information extraction system 122 of FIG. 1 to extract values for a "delivery date" field from each invoice, a new feature may be added to the data extraction schema 400 in addition to the existing features. As another example, an improved machine learning model that yields better results in respect of predicting values for a particular feature may become available after the creation of the data extraction schema 400. The user may thus wish to update the data extraction schema 400 to replace the relevant model deployment identifier with a new model deployment identifier to link the particular feature to the improved machine learning model, or to add the new model deployment identifier to the document extraction schema and specify the new model deployment identifier as having priority over the other model deployment identifier.

This flexibility may also allow for a "hybrid" approach in which a data extraction schema may comprise links to both pre-trained models (created and trained prior to schema creation) and links to models trained specifically for the schema, client, or job in question (created and trained subsequent to schema creation). For example, for a first feature in a given data extraction schema, a pre-trained model may already be available that can predict values for the first feature with a high accuracy, in which case the first feature is linked to the pre-trained model, while a second feature in the data extraction schema requires a new model. The new model can then be created and trained, e.g., on training data specific to the feature and/or job in question, and the data extraction schema can be updated subsequently to link the new model to the second feature.

Figure 5:
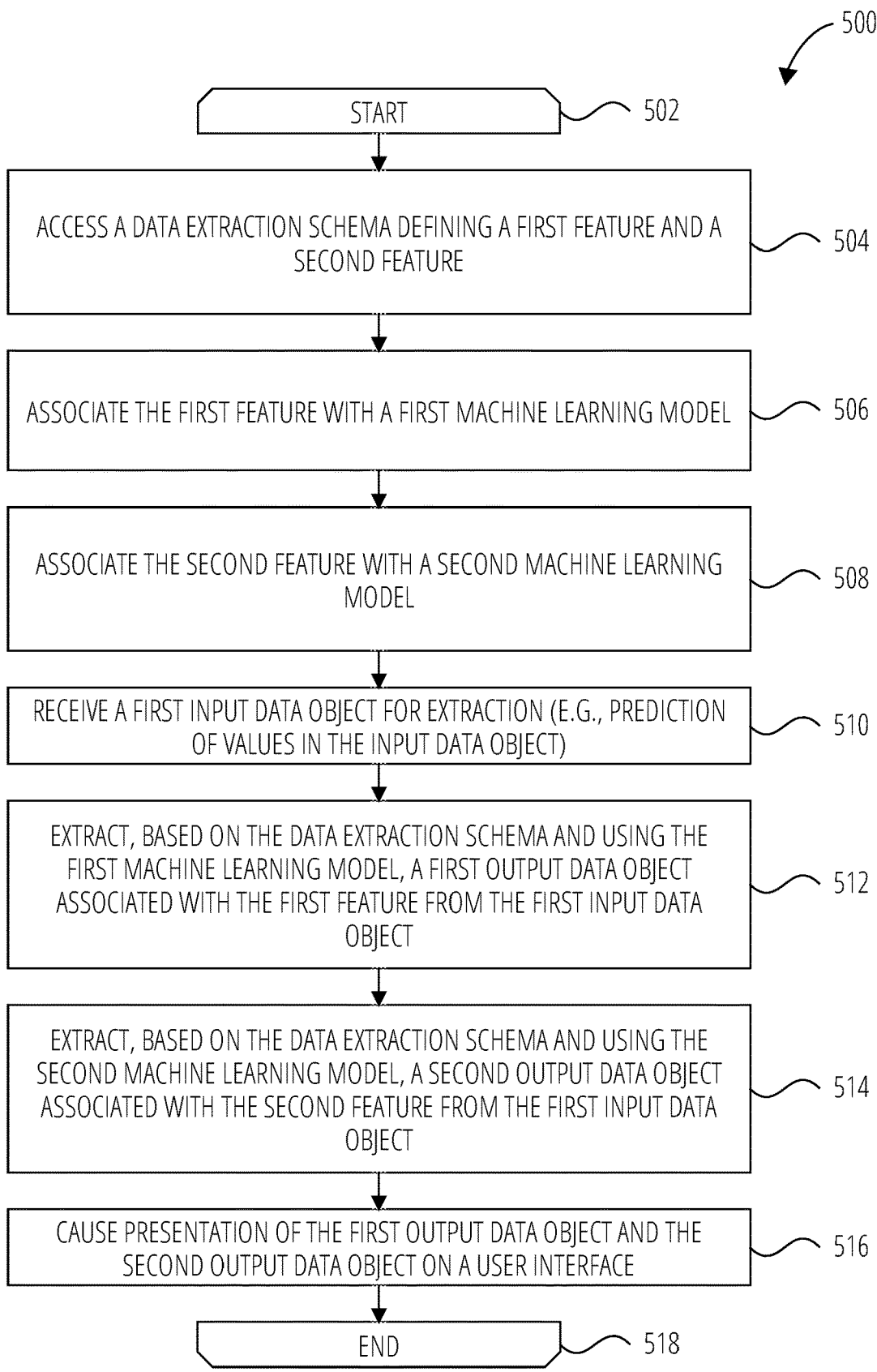
FIG. 5 is a flowchart illustrating operations of a method suitable for data extraction based on a data extraction schema, using machine learning models, according to some examples.

FIG. 5 is a flowchart illustrating operations of a method 500 suitable for data extraction based on a data extraction schema, using machine learning models, according to some examples. By way of example and not limitation, aspects of the method 500 may be performed by the modules, components and databases shown in FIG. 1 and FIG. 2.

The method 500 commences at opening loop operation 502 and progresses to operation 504, where the document information extraction system 122 of FIG. 1 accesses a data extraction schema defining a first feature and a second feature. The data extraction schema may, for example, be the data extraction schema 400 described with reference to FIG. 4. The document information extraction system 122 may receive the data extraction schema, or parts thereof, as user input, e.g., via the web interface 130 of FIG. 1.

At operation 506, the first feature is associated with a first machine learning model, and the second feature is associated with a second machine learning model at operation 508. The first machine learning model is trained to extract, from a given input data object, an output data object associated with the first feature. The second machine learning model is trained to extract, from a given input data object, an output data object associated with the second feature. Examples of model training processes are described below with reference to FIG. 6 and FIG. 9.

The method 500 includes receiving, by the document information extraction system 122 of FIG. 1, a first input data object for extraction (prediction) at operation 510. For example, the first input data object may be a document conforming to a document structure defined in the data extraction schema (the document structure defines the first feature, the second feature, a document type, and other metadata, for example). The document information extraction system 122 may receive the first input data object together with a schema identifier and/or client identifier, enabling the document information extraction system 122 to associate the first input data object with the data extraction schema to be applied to it. For example, the user 128 of FIG. 1 may provide user input via the web interface 130 of FIG. 1 indicating that an uploaded document is associated with a particular data extraction schema. Alternatively, the document information extraction system 122 may analyze an uploaded document and automatically identify the document as being associated with that data extraction schema.

As mentioned, in some examples, the data extraction schema comprises, for each feature, an extractor identifier such as a model deployment identifier. In this way, a schema identifier and/or client identifier links an input data object to the appropriate machine learning models, and each of those machine learning models may then automatically predict a value associated with the feature mapped to the identifier that identifies the particular machine learning model.

At operation 512, based on the data extraction schema and using the first machine learning model, a first output data object associated with the first feature is extracted from the first input data object. For example, the first machine learning model may extract a value associated with "document number" from the document. Similarly, at operation 514, based on the data extraction schema and using the second machine learning model, a second output data object associated with the second feature is extracted from the first input data object. For example, the second machine learning model may extract a value associated with "quantity" from the document. Prior to extraction by a specific machine learning model, an input data object may be pre-processed, e.g., by performing an automatic OCR process.

The document information extraction system 122 may use the model deployment identifier associated with each feature to have the first input data object analyzed by the relevant machine learning model. For example, the first input data object may be submitted to the application server 116 of FIG. 1 as a file (e.g., a PDF document), via an API call, and the extracted results may automatically be provided in response. The user 128 may be enabled to use the web interface 130, e.g., by way of a "POST/documents/jobs" endpoint, to upload an input data object to the document information extraction application in a suitable format.

The document information extraction application may be configured to receive the first input data object and the schema identifier, route extraction requests to the appropriate extractors, e.g., the linked machine learning models (identified by the model deployment identifiers), receive the extraction results, and output the results, e.g., to the user 128 on the client device 106 of FIG. 1.

To route an extraction request to the appropriate machine learning model, the document information extraction system 122 may use the model deployment identifier to access/retrieve a machine learning model URL, and thereby locate the machine learning model. The document information extraction system 122 may transmit a payload, including the input data object, to the URL, in response to which the machine learning model may perform extraction/prediction and return its results. The machine learning model URL may provide access to a web service, provided by the application server 116 or another server. The web service may deploy a trained machine learning model to serve inference requests originating from the web client 110.

At operation 516, the document information extraction system 122 causes presentation on a user interface of the first output data object and the second output data object. The document information extraction system 122 may thus cause presentation of a value associated with each of the first feature and the second feature, according to the predictions made by each feature-specific machine learning model. The user interface may, for example, be the web interface 130 or the app interface 132. The results provided by each machine learning model may be post-processed prior to presentation of output to the user, as described according to some examples with reference to FIG. 7. The method 500 concludes at closing loop operation 518.

It will be appreciated that the document information extraction system 122 may cause extraction of the first output data object and the second output data object in parallel, or partially in parallel. Further, while the above description refers to extraction from a first input data object only, it will be appreciated that the method 500 may be used to extract output data objects from multiple input data objects, sequentially or (completely or partially) in parallel.

As mentioned above, a data extraction schema defining two features is merely an example. The method 500 may include defining or storing a third feature, associating the third feature with an extractor such as a third machine learning model trained to extract, from a given input data object, an output data object associated with the third feature, and using the extractor associated with the third feature to perform such extraction.

Figure 6:
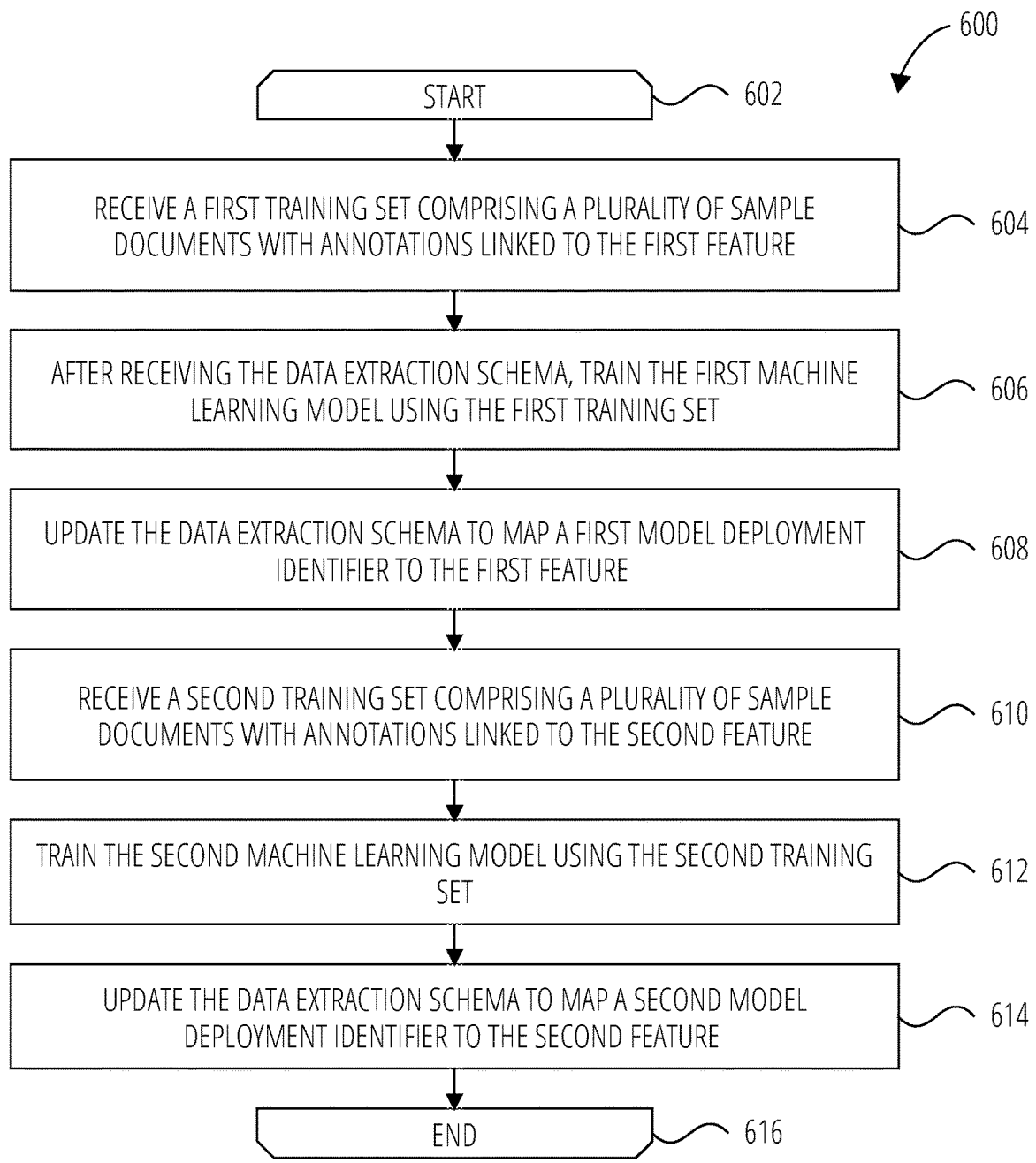
FIG. 6 is a flowchart illustrating operations of a method suitable for training of machine learning models and mapping machine learning models to specific features in a data extraction schema, according to some examples.

FIG. 6 is a flowchart illustrating operations of a method 600 suitable for training of machine learning models and mapping machine learning models to specific features, according to some examples. By way of example and not limitation, aspects of the method 600 may be performed by the modules, components and databases shown in FIG. 1 and FIG. 2. Further, for ease of reference and illustration, the data extraction schema, first feature, second feature, first machine learning model, and second machine learning model, as described with reference to FIG. 5, are again referred to with reference to FIG. 6.

The method 600 commences at opening loop operation 602 and progresses to operation 604, where the document information extraction system 122 of FIG. 1 receives a first training set comprising a plurality of sample documents with annotations linked to the first feature. The first machine learning model is trained on the first training set at operation 606. In some examples, the training of the first machine learning model occurs after the data extraction schema has been created. Once training has been completed, a first model deployment identifier is obtained and mapped to the first feature by the document information extraction system 122, at operation 608, e.g., by updating the data extraction schema as described herein.

The method 600 then progresses to operation 610, where the document information extraction system 122 receives a second training set comprising a plurality of sample documents with annotations linked to the second feature. The second machine learning model is trained on the second training set at operation 612. In some examples, the training of the second machine learning model occurs after the data extraction schema has been created. Once training has been completed, a second model deployment identifier is obtained and mapped to the second feature by the document information extraction system 122, at operation 614, e.g., by updating the data extraction schema as described herein.

In some examples, a model deployment identifier is transmitted to the document information extraction system 122 by the client device 106 of FIG. 1 or a third-party device, e.g., where a training job is performed outside of the server system 104 of FIG. 1. In other words, training of one or more of the machine learning models associated with the data extraction schema need not necessarily be performed by the server system 104. The document information extraction system 122 may, for example, obtain or retrieve a model deployment identifier from a training platform coupled to and associated with the server system 104, or from a third-party training platform, and map the model deployment identifier to the feature in the relevant schema.

As mentioned, in some examples, the first machine learning model is a feature-specific model which is exclusively trained for extraction associated with the first feature, and the second machine learning model is a feature-specific model which is exclusively trained for extraction associated with the second feature. The two machine learning models may thus be trained to analyze and predict values for different features. Training may involve supervised learning, e.g., using sample documents (with annotations) uploaded by a user via the web interface 130 of FIG. 1. In some examples, the first training set differs from the second training set. For example, the first training set may include annotations to provide "ground truth" data related to the first feature, while the second training set may include annotations to provide "ground truth" data related to the second feature. In some examples, one or more of the models may be validated with an annotated (labelled) training set as part of the supervised learning process.

The training process may thus include, for one or more of the sample documents in a training set, (a) annotating and/or correcting data related to the feature (e.g., field) that needs to be trained, and (b) saving/confirming the "ground truth" for the one or more of the sample documents. The document information extraction system 122 may provide, via a suitable user interface, an annotation tool to facilitate annotation and/or correction during or prior to a training job.

As alluded to above, once a training set has been appropriately prepared, the document information extraction system 122 may transmit the training set (e.g., sample documents with "ground truth" data) to a machine learning platform, in or outside of the server system 104, to perform the feature-specific training and model generation. The training set may, for example, be transmitted to such a machine learning platform as an input artifact, as part of a request for a new machine learning model. The model deployment identifier for a particular machine learning model and/or an address for accessing the model (e.g., a web address with credentials) may be obtained by the document information extraction system 122 from the machine learning platform, e.g., after successful training and successful deployment. The method 600 concludes at closing loop operation 616.

Figure 7:
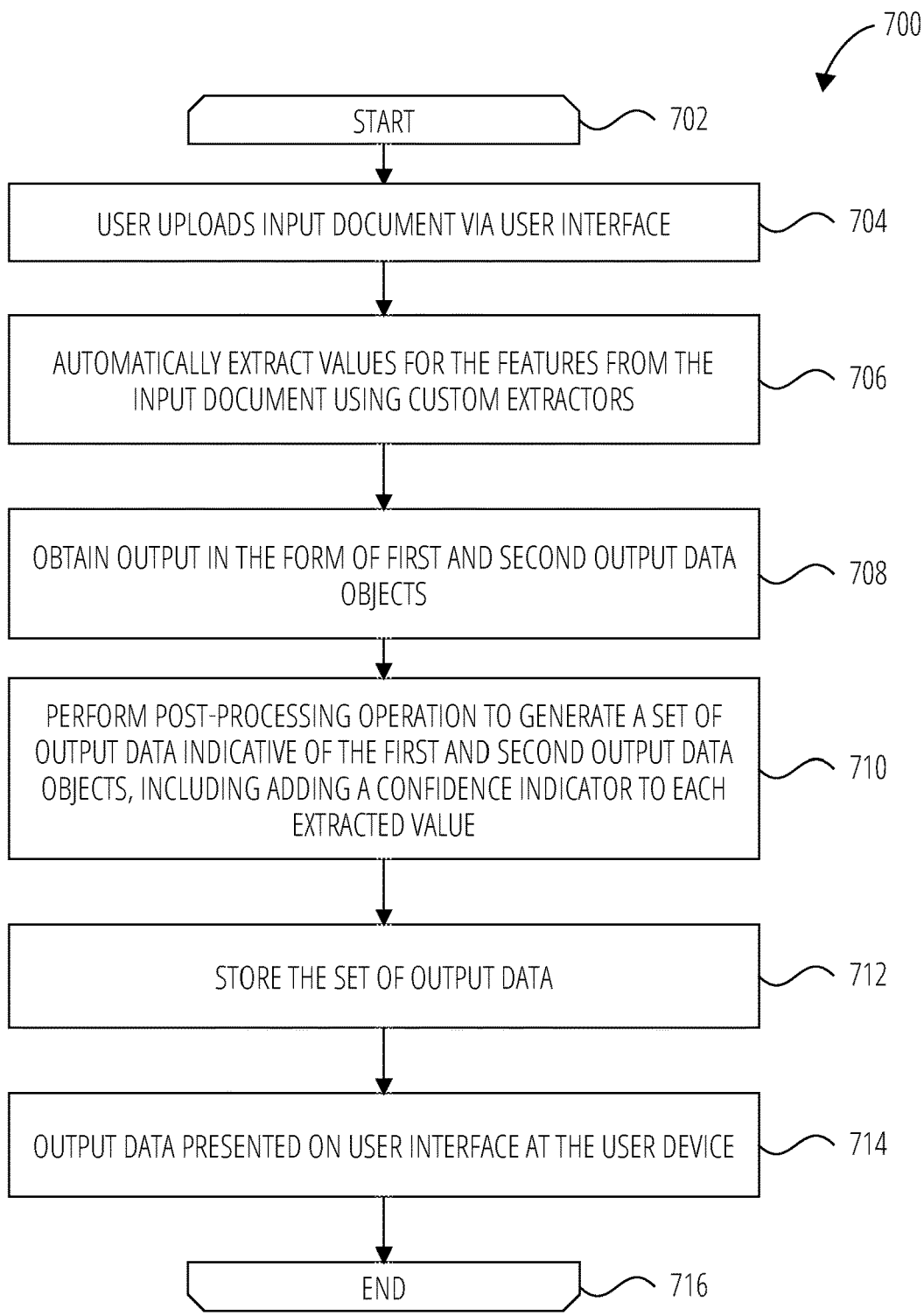
FIG. 7 is a flowchart illustrating operations of a method suitable for processing and presenting output data, according to some examples.

FIG. 7 is a flowchart illustrating operations of a method 700 suitable for processing and presenting output data, according to some examples. By way of example and not limitation, aspects of the method 700 may be performed by the modules, components and databases shown in FIG. 1 and FIG. 2. Further, for ease of reference and illustration, the data extraction schema, first feature, second feature, first machine learning model, and second machine learning model, as described with reference to FIG. 5 and FIG. 6, are again referred to with reference to FIG. 7.

The method 700 commences at opening loop operation 702 and progresses to operation 704, wherein the user 128 of FIG. 1 uploads an input document to the document information extraction application, via the network 102 of FIG. 1, using the client device 106 of FIG. 1. The document information extraction system 122 of FIG. 1 then causes automatic extraction of values for the first and second features contained in the input document, using custom extractors specified in the data extraction schema, in this example being the first and second machine learning models, respectively, at operation 706.

The document information extraction system 122 obtains output in the form of first and second output data objects at operation 708. At operation 710, the method includes performing a post-processing operation to generate a set of output data indicative of the first and second output data objects. The document information extraction system 122 may be configured to identify the number of features present in the data extraction schema and, once the extraction results have been obtained, generate a suitable table including the extraction results (or another output element which facilitates user engagement with the output data). As part of the post-processing operation, a confidence indicator may be added to each extracted value (or an overall confidence indicator may be added). For example, each machine learning model may return a confidence level associated with a predicted value. The document information extraction system 122 may generate a set of output data including the extracted values and a confidence indicator for each value, e.g., "low" (0%-50% confident about the prediction), "medium" (51%-79% confident), and high (80%-100% confident). The document information extraction system 122 may cause presentation of the confidence indicators in the form of color-coded elements, e.g., red for low, orange for medium, and green for high (see FIG. 8, for example).

The method 700 then progresses to operation 712, wherein the set of output data is stored in one of the databases 126 of FIG. 1, and then to operation 714, wherein the set of output data is presented on a user interface at a user device, e.g., on the web interface 130 of FIG. 1 at the client device 106. An example of such a user interface is shown in FIG. 8.

The document information extraction system 122 may, in some examples, provide data enrichment functionality. For example, in addition to the extracted fields mentioned above, being the values for the first and second features, the document information extraction system 122 may be configured to cause analysis of the input data object in question and enrichment of the set of output data with further information. For example, in addition to the extracted document number and quantity, a machine learning model may be applied to determine a customer identifier in the input document, and that information may be added to the set of output data and presented to a user. In some examples, the document information extraction system 122 may determine that an enrichment data record, e.g., in the databases 126, matches the document being analyzed, and add information from the enrichment data record to the set of output data. The method concludes at closing loop operation 716.

Figure 8:
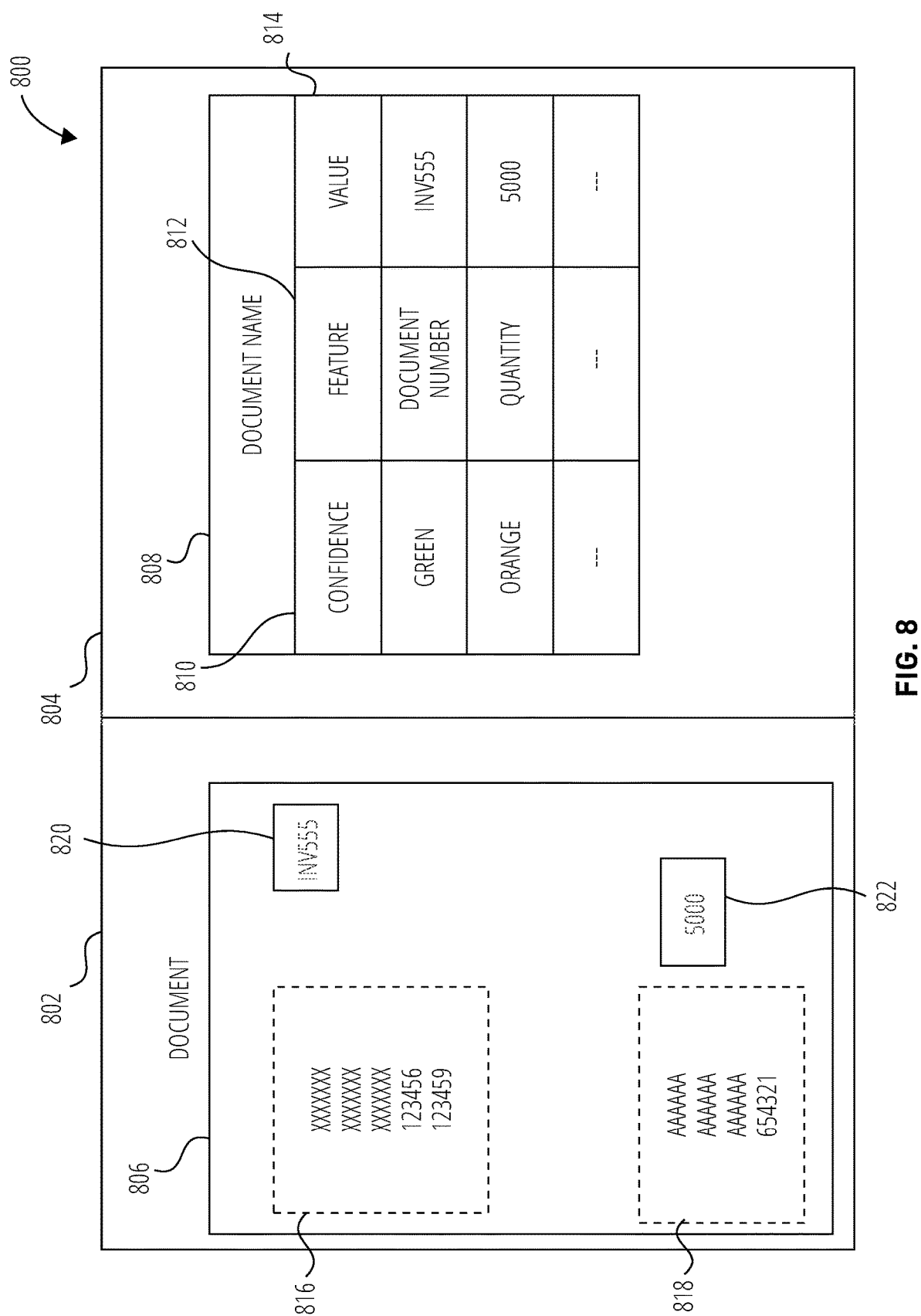
FIG. 8 is a user interface diagram illustrating a results user interface, according to some examples.

FIG. 8 is a user interface diagram depicting a results user interface 800, according to some examples, that may be presented by a web client 110 of FIG. 1 at a client device 106 of FIG. 1. The user interface 800 may be presented on a screen of the client device 106 or presented to the user 128 at a user device in any other suitable manner.

The results user interface 800 may be presented once extraction operations have been completed and the set of output data has been generated by the document information extraction system 122 of FIG. 1. The user interface 800 comprise a document viewer section 802 and an extraction results section 804. The document viewer section 802, located on the left side of the user interface 800, enables the user 128 of FIG. 1 to view and navigate the relevant document 806 (from which the values has been extracted). The extraction results section 804, located on the right side of the user interface 800, displays the results in tabular form.

The table shows the document name 808 and, for each feature considered by the document information extraction system 122, a confidence level 810, a feature name 812, and the extracted/predicted value 814. The user 128 can use the user interface 800 to compare the value 814 obtained by a machine learning model for a particular feature, to the actual values displayed in the document viewer section 802. In the example of FIG. 8, these are the document number 820 and the quantity 822, and it will be noted that the values in the extraction results section 804 are shown as correctly extracted by the custom machine learning models.

The user interface 800 allows the user 128 to consider the entire document in context in the document viewer section 802, including other data objects 816 and 818 not included in the analysis, as the user 128 may possibly wish to update the data extraction schema to add further features, modify existing features, or the like. A similar user interface may also be utilized to enable the user 128 to make annotations or corrections, e.g., where the extraction results section 804 displays incorrect results.

Figure 9:
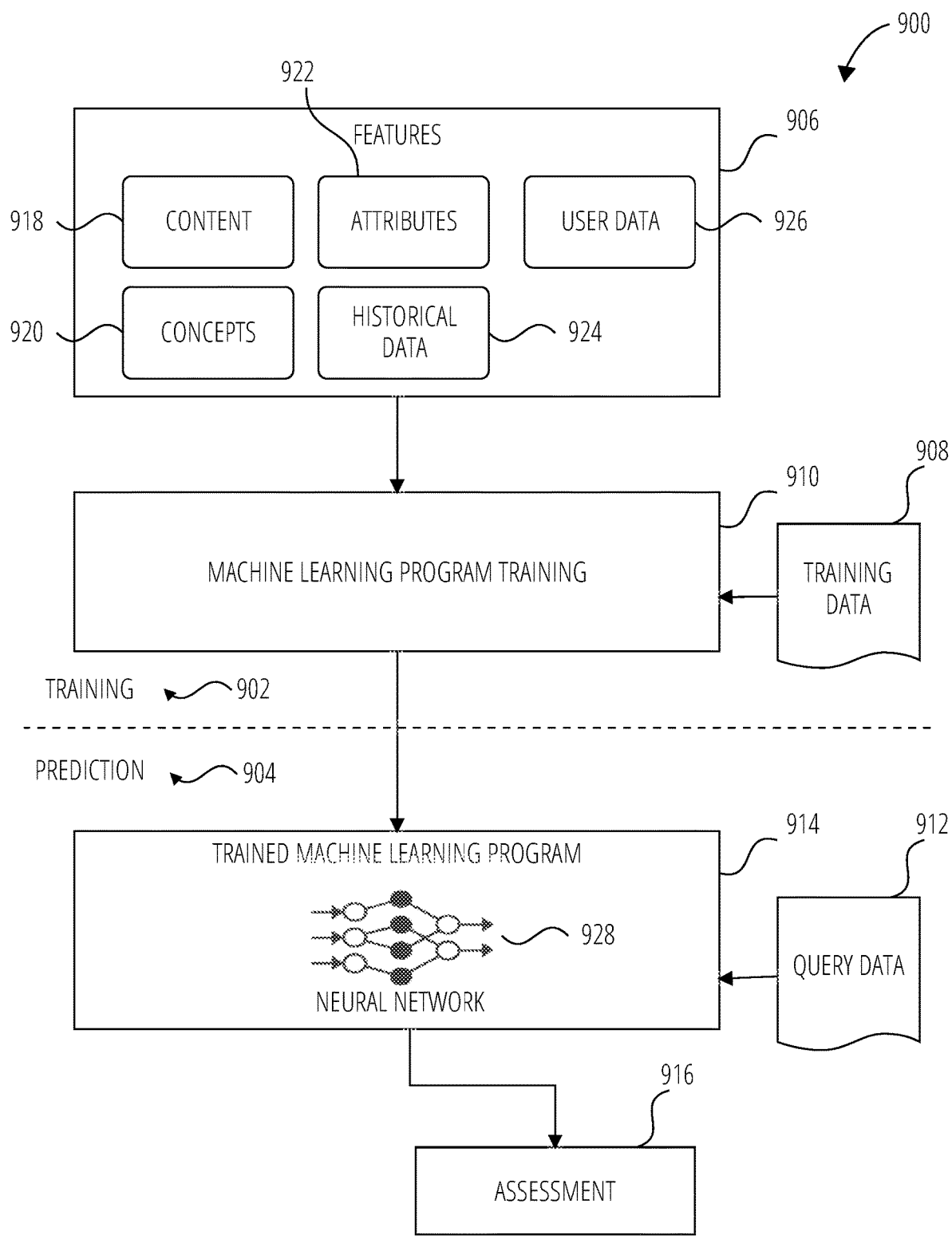
FIG. 9 diagrammatically illustrates training and use of a machine learning program, according to some examples.

FIG. 9 is a block diagram showing a machine learning tool 900, according to some examples. Machine learning tools such as the machine learning tool 900, also referred to as machine learning algorithms or programs, may be used as part of the systems and methodologies described herein to perform operations associated with training and/or data extraction.

Machine learning tools operate by building a model from example training data 908, also referred to as training sets, in order to make data-driven predictions or decisions expressed as outputs or assessments (e.g., assessment 916). Although examples are presented with respect to a few machine learning tools, the principles presented herein may be applied to other machine learning tools.

One of ordinary skill in the art will be familiar with several machine learning tools that may be applied with the present disclosure, including linear regression, logistic regression, Naive-Bayes, random forests, decision tree learning, neural networks, DNNs, genetic or evolutionary algorithms, matrix factorization, support vector machines (SVM), and the like.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning tool 900 supports two types of phases, namely a training phase 902 and prediction phase 904. In training phases 902, supervised learning, unsupervised or reinforcement learning may be used. For example, the machine learning tool 900 (1) receives features 906 (e.g., as structured or labeled/annotated data in supervised learning) and/or (2) identifies features 906 (e.g., unstructured or unlabeled data for unsupervised learning) in training data 908. In prediction phases 904, the machine learning tool 900 uses the features 906 for analyzing query data 912 to generate outcomes or predictions, as examples of an assessment 916.

In the training phase 902, feature engineering may be used to identify features 906 and may include identifying informative, discriminating, and independent features for the effective operation of the machine learning tool 900 in pattern recognition, classification, and regression. In some examples, the training data 908 includes labeled data, which is known data for pre-identified features 906 and one or more outcomes. In the context of a machine learning tool, each of the features 906 may be a variable or attribute, such as individual measurable property of a process, article, system, or phenomenon represented by a data set (e.g., the training data 908). Features 906 may also be of different types, such as numeric features, strings, and graphs, and may include one or more of content 918, concepts 920, attributes 922, historical data 924 and/or user data 926, merely for example.

In training phases 902, the machine learning tool 900 may use the training data 908 to find correlations among the features 906 that affect a predicted outcome or assessment 916.

With the training data 908 and the identified features 906, the machine learning tool 900 is trained during the training phase 902 at machine learning program training 910. The machine learning tool 900 appraises values of the features 906 as they correlate to the training data 908. The result of the training is the trained machine learning program 914 (e.g., a trained or learned model).

Further, the training phases 902 may involve machine learning, in which the training data 908 is structured (e.g., labeled during preprocessing operations), and the trained machine learning program 914 may implement a neural network 928 capable of performing, for example, classification and clustering operations. In other examples, the training phase 902 may involve deep learning, in which the training data 908 is unstructured, and the trained machine learning program 914 implements a deep neural network 928 that is able to perform both feature extraction and classification/clustering operations.

A neural network 928 generated during the training phase 902, and implemented within the trained machine learning program 914, may include a hierarchical (e.g., layered) organization of neurons. For example, neurons (or nodes) may be arranged hierarchically into a number of layers, including an input layer, an output layer, and multiple hidden layers. Each of the layers within the neural network 928 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 928 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

A machine learning model may be run against training data for several epochs, in which the training data is repeatedly fed into the model to refine its results. In each epoch, the entire training data set is used to train the model. Multiple epochs (e.g., iterations over the entire training data set) may be used to train the model. In some examples, the number of epochs is 10, 100, 500, or 1100. Within an epoch, one or more batches of the training data set are used to train the model. Thus, the batch size ranges between 1 and the size of the training dataset while the number of epochs is any positive integer value. The model parameters are updated after each batch (e.g., using gradient descent).

Each model may develop a rule or algorithm over several epochs by varying the values of one or more variables affecting the inputs to more closely map to a desired result, but as the training data set may be varied, and is preferably very large, perfect accuracy and precision may not be achievable. A number of epochs that make up a training phase 902, therefore, may be set as a given number of trials or a fixed time/computing budget, or may be terminated before that number/budget is reached when the accuracy of a given model is high enough or low enough or an accuracy plateau has been reached. For example, if the training phase 902 is designed to run n epochs and produce a model with at least 95% accuracy, and such a model is produced before the nth epoch, the training phase 902 may end early and use the produced model satisfying the end-goal accuracy threshold. Similarly, if a given model is inaccurate enough to satisfy a random chance threshold (e.g., the model is only 55% accurate in determining true/false outputs for given inputs), the training phase 902 for that model may be terminated early, although other models in the training phase 902 may continue training. Similarly, when a given model continues to provide similar accuracy or vacillate in its results across multiple epochs—having reached a performance plateau—the training phase 902 for the given model may terminate before the epoch number/computing budget is reached.

Once the training phase 902 is complete, a model is finalized. In some examples, models that are finalized are evaluated against testing criteria. In a first example, a testing data set that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

During prediction phases 904, the trained machine learning program 914 is used to perform an assessment. Query data 912 is provided as an input to the trained machine learning program 914, and the trained machine learning program 914 generates the assessment 916 as output, responsive to receipt of the query data 912.

In some examples, for extraction or prediction of values contained in documents, a character grid or "chargrid" approach may be employed. This approach makes use of a two-dimensional grid of characters to preserve the two-dimensional layout structure of documents, while simultaneously working on textual content. Chargrid makes use of fully convolutional encoder—decoder networks. This approach can be used to recognize characters (OCR) and analyze contextual information of characters (e.g., invoice number or invoice date), while taking into account aspects such as document format. A chargrid model predicts a segmentation mask and bounding boxes and may represent a document as an image with many color channels.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors configured by the instructions to perform operations comprising: accessing a data extraction schema, the data extraction schema defining a first feature and a second feature; associating the first feature with a first machine learning model, the first machine learning model being trained to extract, from a given input data object, an output data object associated with the first feature; associating the second feature with a second machine learning model, the second machine learning model being trained to extract, from the given input data object, an output data object associated with the second feature; receiving a first input data object; extracting, based on the data extraction schema and using the first machine learning model, a first output data object associated with the first feature from the first input data object; extracting, based on the data extraction schema and using the second machine learning model, a second output data object associated with the second feature from the first input data object; and causing presentation on a user interface of the first output data object and the second output data object.

In Example 2, the subject matter of Example 1, wherein the first input data object is a document, and wherein the data extraction schema defines a document structure comprising the first feature and the second feature.

In Example 3, the subject matter of Examples 1-2, wherein the first input data object conforms to the document structure.

In Example 4, the subject matter of Examples 1-3, wherein the operations further comprise: training the first machine learning model using a first training set, the training of the first machine learning model being performed after creation of the data extraction schema.

In Example 5, the subject matter of Examples 1-4, wherein the training of the first machine learning model comprises supervised learning, the operations further comprising receiving, via a network and from a user device associated with a user, the first training set, the first training set comprising a plurality of sample documents with annotations linked to the first feature.

In Example 6, the subject matter of Examples 1-5, wherein the associating of the first feature with the first machine learning model comprises updating the data extraction schema to map a first model deployment identifier to the first machine learning model, and wherein the associating of the second feature with the second machine learning model comprises updating the data extraction schema to map a second model deployment identifier to the second machine learning model.

In Example 7, the subject matter of Examples 1-6, wherein the first machine learning model is a first feature-specific model which is exclusively trained for extraction associated with the first feature, and wherein the second machine learning model is a second feature-specific model which is exclusively trained for extraction associated with the second feature, the first feature being different from the second feature.

In Example 8, the subject matter of Examples 1-7, wherein the accessing of the data extraction schema comprises receiving, via a network and from a user device associated with a user, user input indicative of the data extraction schema.

In Example 9, the subject matter of Examples 1-8, wherein the data extraction schema defines a first data type for the first feature and a second data type for the second feature.

In Example 10, the subject matter of Examples 1-9, wherein at least one of the first feature or the second feature is a field.

In Example 11, the subject matter of Examples 1-10, wherein at least one of first feature or the second feature is a line item.

In Example 12, the subject matter of Examples 1-11, wherein: the operations further comprise performing a post-processing operation to generate a set of output data indicative of the first output data object and the second output data object; and the causing of the presentation on the user interface of the first output data object and the second output data object comprises providing, via a network, the set of output data to a user device associated with a user.

In Example 13, the subject matter of Examples 1-12, wherein the set of output data further comprises a confidence indicator.

In Example 14, the subject matter of Examples 1-13, wherein each of the first machine learning model and the second machine learning model comprises a convolutional neural network.

Example 15 is a method comprising: accessing, by one or more processors, a data extraction schema, the data extraction schema defining a first feature and a second feature; associating, by the one or more processors, the first feature with a first machine learning model, the first machine learning model being trained to extract, from a given input data object, an output data object associated with the first feature; associating, by the one or more processors, the second feature with a second machine learning model, the second machine learning model being trained to extract, from the given input data object, an output data object associated with the second feature; receiving, by the one or more processors, a first input data object; extracting, by the one or more processors, based on the data extraction schema and using the first machine learning model, a first output data object associated with the first feature from the first input data object; extracting, by the one or more processors, based on the data extraction schema and using the second machine learning model, a second output data object associated with the second feature from the first input data object; and causing presentation on a user interface of the first output data object and the second output data object.

In Example 16, the subject matter of Example 15, wherein the first input data object is a document, and wherein the data extraction schema defines a document structure comprising the first feature and the second feature.

In Example 17, the subject matter of Examples 15-16, wherein the method further comprises training the first machine learning model using a first training set, the training of the first machine learning model being performed after creation of the data extraction schema.

Example 18 is a non-transitory computer-readable medium that stores instructions that, when executed by one or more processors, cause the one or more processors to perform operations comprising: accessing a data extraction schema, the data extraction schema defining a first feature and a second feature; associating the first feature with a first machine learning model, the first machine learning model being trained to extract, from a given input data object, an output data object associated with the first feature; associating the second feature with a second machine learning model, the second machine learning model being trained to extract, from the given input data object, an output data object associated with the second feature; receiving a first input data object; extracting, based on the data extraction schema and using the first machine learning model, a first output data object associated with the first feature from the first input data object; extracting, based on the data extraction schema and using the second machine learning model, a second output data object associated with the second feature from the first input data object; and causing presentation on a user interface of the first output data object and the second output data object.

In Example 19, the subject matter of Example 18, wherein the first input data object is a document, and wherein the data extraction schema defines a document structure comprising the first feature and the second feature.

In Example 20, the subject matter of Examples 18-19, wherein the operations further comprise training the first machine learning model using a first training set, the training of the first machine learning model being performed after creation of the data extraction schema.

Example 21 is a system comprising: a memory that stores instructions; and one or more processors configured by the instructions to perform operations comprising: receiving or accessing a data extraction schema, the data extraction schema defining a first feature and a second feature; associating the first feature with a first extractor; associating the second feature with a second extractor; receiving a first input data object; extracting, based on the data extraction schema and using the first extractor, a first output data object associated with the first feature from the first input data object; extracting, based on the data extraction schema and using the second extractor, a second output data object associated with the second feature from the first input data object; and causing presentation on a user interface of the first output data object and the second output data object.

Example 22 is at least one machine-readable medium including instructions that, when executed by processing circuitry, cause the processing circuitry to perform operations to implement any of Examples 1-21.

Example 23 is an apparatus comprising means to implement any of Examples 1-21.

Example 24 is a system to implement any of Examples 1-21.

Example 25 is a method to implement any of Examples 1-21.

Figure 10:
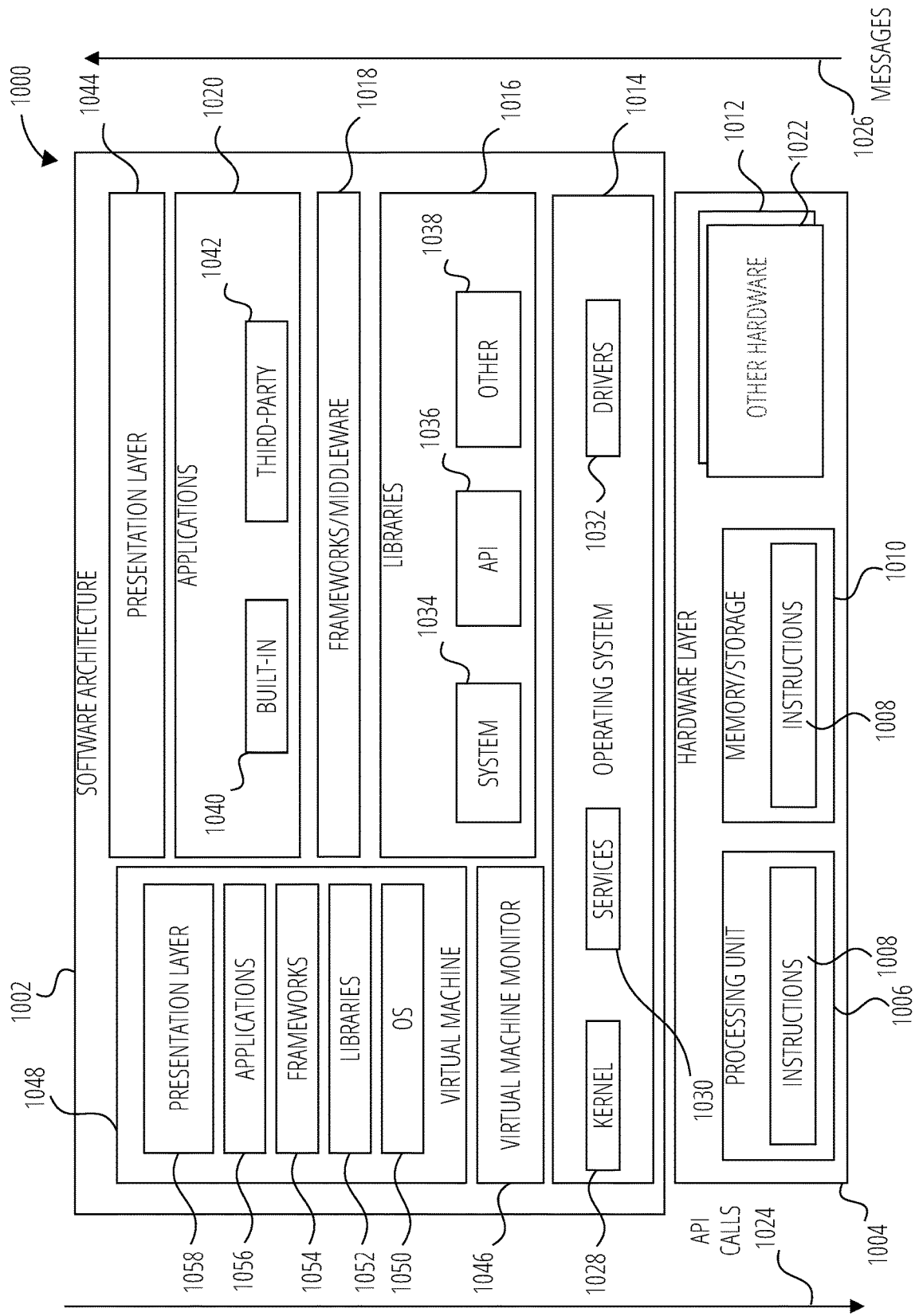
FIG. 10 is a block diagram showing a software architecture for a computing device, according to some examples.

FIG. 10 is a block diagram 1000 showing a software architecture 1002 for a computing device, according to some examples. The software architecture 1002 may be used in conjunction with various hardware architectures, for example, as described herein. FIG. 10 is merely a non-limiting illustration of a software architecture, and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 and other hardware 1022 which represent any other hardware of the hardware layer 1004, such as the other hardware illustrated as part of the software architecture 1002.

In the architecture of FIG. 10, the software architecture 1002 may be conceptualized as a stack of layers where each layer provides particular functionality. For example, the software architecture 1002 may include layers such as an operating system 1014, libraries 1016, frameworks/middleware layer 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the software architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware layer 1018 may provide a higher-level common infrastructure that may be utilized by the applications 1020 and/or other software components/modules. For example, the frameworks/middleware layer 1018 may provide various graphic user interface (GUI) functions, high-level resource management, high-level location services, and so forth. The frameworks/middleware layer 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), and frameworks/middleware layer 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (e.g., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in a memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Electronic Apparatus and System

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Example Machine Architecture and Machine-Readable Medium

Figure 11:
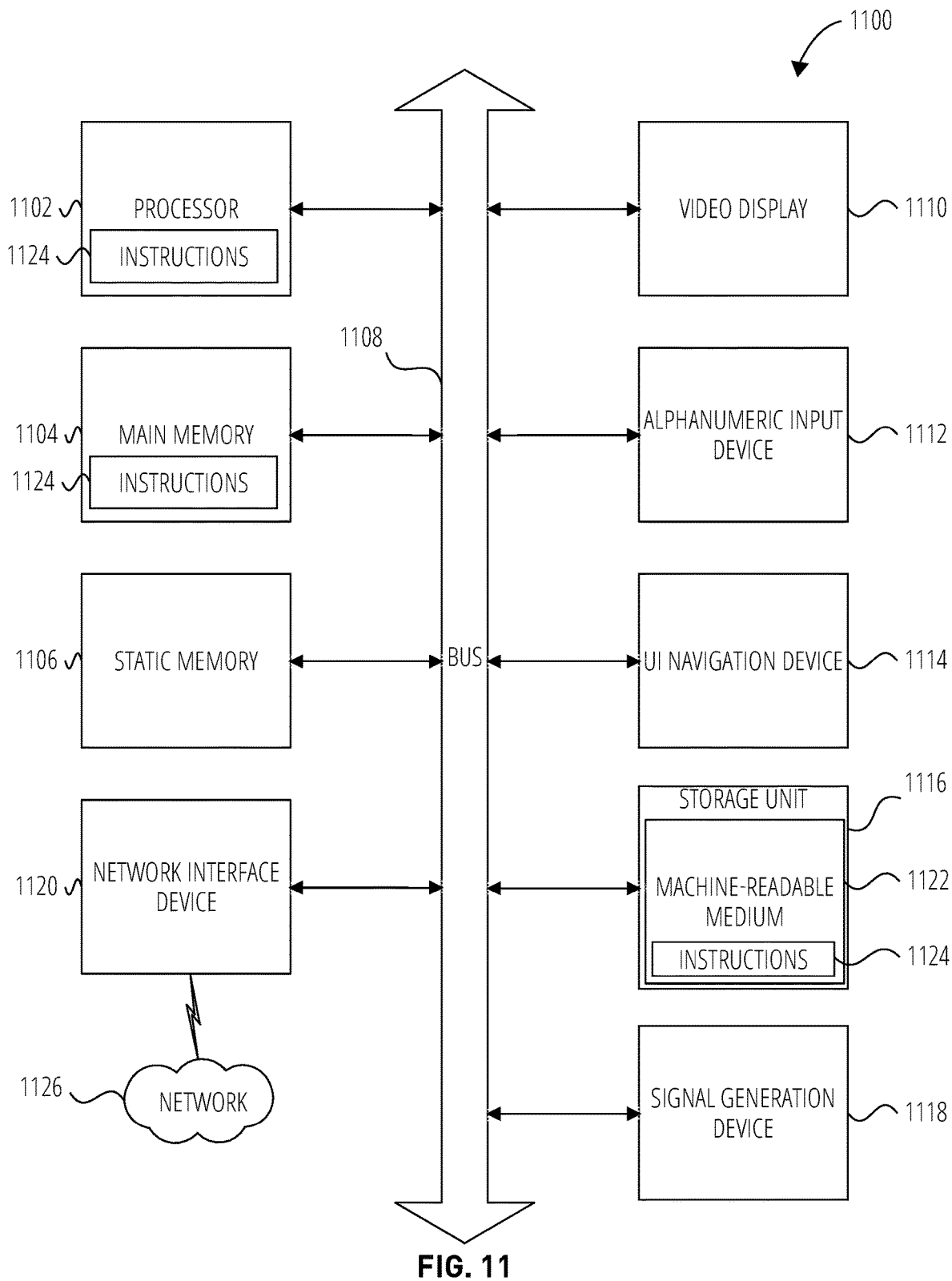
FIG. 11 is a block diagram of a machine in the form of a computer system, according to some examples, within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in accordance with some examples to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the "embodiment" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:
a memory that stores instructions; and
one or more processors configured by the instructions to perform operations comprising:
    accessing a data extraction schema, the data extraction schema defining a first feature and a second feature;
    associating the first feature with a first machine learning model, the first machine learning model being trained to extract, from a given input data object, an output data object associated with the first feature;
    associating the second feature with a second machine learning model, the second machine learning model being trained to extract, from the given input data object, an output data object associated with the second feature;
    receiving a first input data object;
    extracting, based on the data extraction schema and using the first machine learning model, a first output data object associated with the first feature from the first input data object;

extracting, based on the data extraction schema and using the second machine learning model, a second output data object associated with the second feature from the first input data object; and causing presentation on a user interface of the first output data object and the second output data object.

2. The system of claim 1, wherein the first input data object is a document, and wherein the data extraction schema defines a document structure comprising the first feature and the second feature.

3. The system of claim 2, wherein the first input data object conforms to the document structure.

4. The system of claim 2, the operations further comprising:

training the first machine learning model using a first training set, the training of the first machine learning model being performed after creation of the data extraction schema.

5. The system of claim 4, wherein the training of the first machine learning model comprises supervised learning, the operations further comprising receiving, via a network and from a user device associated with a user, the first training set, the first training set comprising a plurality of sample documents with annotations linked to the first feature.

6. The system of claim 2, wherein at least one of the first feature or the second feature is a field.

7. The system of claim 2, wherein at least one of first feature or the second feature is a line item.

8. The system of claim 1, wherein the associating of the first feature with the first machine learning model comprises updating the data extraction schema to map a first model deployment identifier to the first feature, and wherein the associating of the second feature with the second machine learning model comprises updating the data extraction schema to map a second model deployment identifier to the second feature.

9. The system of claim 1, wherein the first machine learning model is a first feature-specific model which is exclusively trained for extraction associated with the first feature, and wherein the second machine learning model is a second feature-specific model which is exclusively trained for extraction associated with the second feature, the first feature being different from the second feature.

10. The system of claim 1, wherein the accessing of the data extraction schema comprises receiving, via a network and from a user device associated with a user, user input indicative of the data extraction schema.

11. The system of claim 1, wherein the data extraction schema defines a first data type for the first feature and a second data type for the second feature.

12. The system of claim 1, wherein:

the operations further comprise a post-processing operation to generate a set of output data indicative of the first output data object and the second output data object; and the causing of the presentation on the user interface of the first output data object and the second output data object comprises providing, via a network, the set of output data to a user device associated with a user.

13. The system of claim 12, wherein the set of output data further comprises a confidence indicator.

14. The system of claim 1, wherein each of the first machine learning model and the second machine learning model comprises a convolutional neural network.

15. A method comprising:

accessing, by one or more processors, a data extraction schema, the data extraction schema defining a first feature and a second feature;

associating, by the one or more processors, the first feature with a first machine learning model, the first machine learning model being trained to extract, from a given input data object, an output data object associated with the first feature;

associating, by the one or more processors, the second feature with a second machine learning model, the second machine learning model being trained to extract, from the given input data object, an output data object associated with the second feature;

receiving, by the one or more processors, a first input data object;

extracting, by the one or more processors, based on the data extraction schema and using the first machine learning model, a first output data object associated with the first feature from the first input data object;

extracting, by the one or more processors, based on the data extraction schema and using the second machine learning model, a second output data object associated with the second feature from the first input data object; and causing presentation on a user interface of the first output data object and the second output data object.

16. The method of claim 15, wherein the first input data object is a document, and wherein the data extraction schema defines a document structure comprising the first feature and the second feature.

17. The method of claim 16, further comprising:

training the first machine learning model using a first training set, the training of the first machine learning model being performed after creation of the data extraction schema.

18. A non-transitory computer-readable medium that stores instructions that, when executed by one or more processors, cause the one or more processors to perform operations comprising:

accessing a data extraction schema, the data extraction schema defining a first feature and a second feature;

associating the first feature with a first machine learning model, the first machine learning model being trained to extract, from a given input data object, an output data object associated with the first feature;

associating the second feature with a second machine learning model, the second machine learning model being trained to extract, from the given input data object, an output data object associated with the second feature;

receiving a first input data object;

extracting, based on the data extraction schema and using the first machine learning model, a first output data object associated with the first feature from the first input data object;

extracting, based on the data extraction schema and using the second machine learning model, a second output data object associated with the second feature from the first input data object; and causing presentation on a user interface of the first output data object and the second output data object.

19. The non-transitory computer-readable medium of claim 18, wherein the first input data object is a document, and wherein the data extraction schema defines a document structure comprising the first feature and the second feature.

20. The non-transitory computer-readable medium of claim 19, the operations further comprising:

training the first machine learning model using a first training set, the training of the first machine learning model being performed after creation of the data extraction schema.

\* \* \* \* \*